US008980067B2

(12) United States Patent
Secherling et al.

(10) Patent No.: US 8,980,067 B2
(45) Date of Patent: Mar. 17, 2015

(54) METHOD AND APPARATUS FOR ETCHING THE SURFACES OF INTEGRALLY BLADED ROTORS

(75) Inventors: Arno Secherling, Oberursel (DE); Reinhard Koenig, Ober Moerlen (DE); Morgan Oparaugo, Obertshausen (DE)

(73) Assignee: Rolls-Royce Deutschland Ltd & Co KG (DE)

( * ) Notice: Subject to any disclaimer, the term of this patent is extended or adjusted under 35 U.S.C. 154(b) by 481 days.

(21) Appl. No.: 12/774,091

(22) Filed: May 5, 2010

(65) Prior Publication Data

US 2010/0288648 A1 Nov. 18, 2010

(30) Foreign Application Priority Data

May 15, 2009 (DE) ........................ 10 2009 021 561

(51) Int. Cl.

| | |
|---|---|
| ***C25D 17/00*** | (2006.01) |
| ***B23H 9/10*** | (2006.01) |
| ***B23H 3/00*** | (2006.01) |
| ***C25F 3/02*** | (2006.01) |
| ***F01D 5/34*** | (2006.01) |

(52) U.S. Cl.

CPC ... *C25F 3/02* (2013.01); *F01D 5/34* (2013.01); *F05D 2230/11* (2013.01); *F05D 2230/90* (2013.01)

USPC ...................... 204/224 M; 204/242; 205/640

(58) Field of Classification Search

CPC .......... C25F 3/02; F05D 2230/11; F01D 5/34

USPC ............................. 205/640; 204/242, 224 M

See application file for complete search history.

(56) References Cited

U.S. PATENT DOCUMENTS

| | | | | |
|---|---|---|---|---|
| 4,184,932 | A | 1/1980 | Ahlgrim et al. | |
| 5,244,548 | A * | 9/1993 | Bruns et al. | 428/598 |
| 6,969,457 | B2 * | 11/2005 | MacDonald et al. | 205/674 |
| 7,462,273 | B2 * | 12/2008 | Mielke | 205/651 |
| 2004/0154915 | A1 * | 8/2004 | Kovarsky et al. | 204/237 |

(Continued)

FOREIGN PATENT DOCUMENTS

| | | |
|---|---|---|
| DE | 2920844 | 12/1980 |
| DE | 220347 | 3/1985 |

OTHER PUBLICATIONS

European Search Report dated Mar. 12, 2014 from counterpart App No. 1 0159964.5.

(Continued)

*Primary Examiner* — Bryan D. Ripa
*Assistant Examiner* — Brian W Cohen
(74) *Attorney, Agent, or Firm* — Timothy J. Klima; Shuttleworth & Ingersoll, PLC

(57) ABSTRACT

For electrolytically etching the surfaces of integrally bladed rotors (blisks) (6) made of nickel-base material for aircraft gas turbines, auxiliary cathodes (10), in addition to the main cathodes (3) provided in the electrolyte (1), are arranged in the area of the blades (9) remote from the electric contact points at the rotor disk (7). The auxiliary cathodes are adaptable in shape, arrangement and size to the blade and disk geometry, so that a uniform current flow from all parts of the rotor connected as anode via the electrolyte to the main and auxiliary cathodes is produced and an intense and uniform etching effect is achieved. This ensures a reliable structural assessment in all rotor areas and in particular also in the area of the integral blading.

13 Claims, 3 Drawing Sheets

(56) References Cited

U.S. PATENT DOCUMENTS

Figure 1:
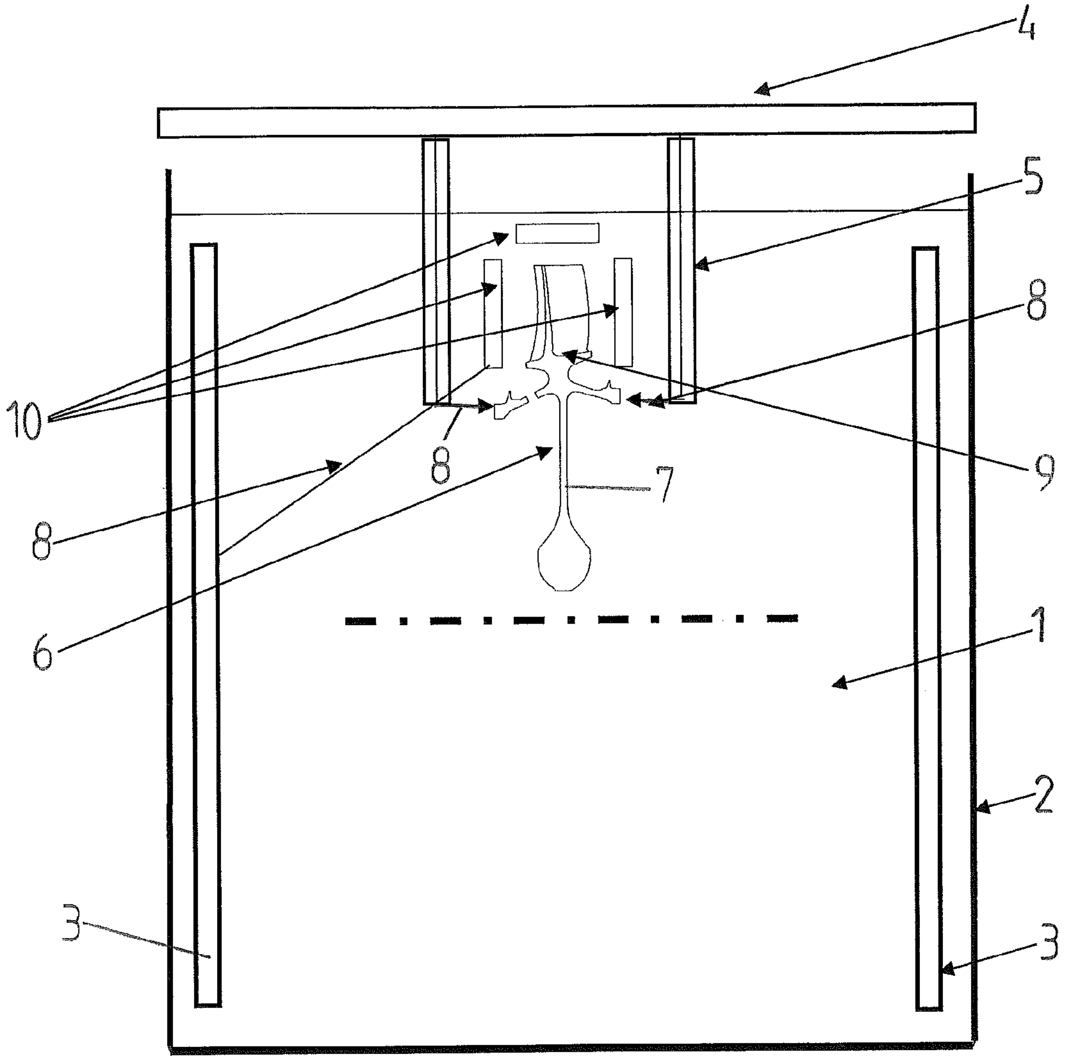

| | | | | |
|---|---|---|---|---|
| 2004/0217013 | A1* | 11/2004 | Lee et al. | 205/659 |
| 2005/0034994 | A1* | 2/2005 | Ashjaee et al. | 205/137 |
| 2008/0253922 | A1* | 10/2008 | Trimmer et al. | 420/419 |
| 2011/0278162 | A1* | 11/2011 | Fredenberg et al. | 204/297.14 |

OTHER PUBLICATIONS

Adam, P.: Fertigungsverfahren von Turboflugtriebwerken. Birkhauser—Verlag, Basel, 1988, S. 73, 74 insbes. S. 74, 2 Abs.

Lexikon Fur Metalloberflachen-Veredelung, Teil 1, Eugen Leuzen-Verlag, Saul-gau, 1989, Schlagwort: Hillskalode.

* cited by examiner

METHOD AND APPARATUS FOR ETCHING THE SURFACES OF INTEGRALLY BLADED ROTORS

This application claims priority to German Patent Application DE102009021561.1 filed May 15, 2009, the entirety of which is incorporated by reference herein.

This invention relates to a method and an apparatus for etching the surfaces of integrally bladed rotors (blisks) of aircraft gas turbines.

The surfaces of the rotors of turbines or compressors of aircraft gas turbines are, as is generally known, subjected to an etching process after finish machining by mechanical or chemical removal processes to enable a structural examination to be subsequently made and structural defects, if any, to be better imaged and revealed and, finally, the in-service failure safety of critically classified rotary components to be improved. Surface etching of rotors made of nickel-base material can, among others, be accomplished by immersion in an etchant. The etching effect of this process is, however, not strong enough to enable a satisfactory structural examination to be made and positively and reliably detect all structural defects. It has also been proposed that the surface of unbladed rotor disks made of nickel-base material be etched electrolytically. Here, the electrochemical removal of surface material is effected by the transfer of electric charge between the metallic material of the workpiece and a liquid electrolyte. In this process, the rotor disk is immersed into the electrolyte and connected as anode (positive pole of a direct-current source). The flow of current via the electrolyte and a cathode, in connection with the electrolyte, causes material to be removed from the metal surface by metal ions going into solution. The apparatus provided for the performance of the etching process includes a container which is filled with electrolyte and has cathodes arranged on the sidewalls and, disposed above the container and suspended from a contact bar forming the positive pole, a holding device for the rotor disk thus acting as anode. On unbladed disks, electrolytic etching using this apparatus, as compared to pure immersion etching, enables a stronger etching effect to be obtained and structural examination to be improved. For the structural examination or the safe detection of structural defects of bladed rotors (blisks) in nickel-base material, electrolytic etching using the known apparatus is only restrictedly useful because the etching effect in the blade area, due to the complex blade geometry and the current losses occurring from the contacts at the rotor disk to the blade tips, is inconsistent and also lower in relation to the disk surface. Therefore, the removal of surface material from blisks for the purpose of subsequent structural examination is performed by use of the more consistent, but less intense, immersion etching process by which, however, reliable structural examination is not ensured.

A broad aspect of this invention is to provide a method and an apparatus for etching the surfaces of integrally bladed rotors (rotor disks) in nickel-base material such that a reliable detection of structural defects in ensured in all surface areas.

The present invention provides that nickel-base, integrally bladed rotors for aircraft gas turbines are electrolytically etched for structural examination in that, from all parts of the rotor connected as anode, a uniform current flow via the electrolyte to the main and auxiliary cathodes is produced in the blade areas remote from the electrical contact points at the rotor disk by providing additional auxiliary cathodes disposed aside the main cathodes, thereby obtaining a sufficiently strong and consistent etching effect for blisks made of nickel-base material and ensuring reliable structural examination also in the bladed area.

According to the present invention, an apparatus for obtaining uniform current flow from the entire surface of the rotor connected as anode via the electrolyte includes an electrolyte-filled container with main cathodes arranged therein and, suspended from a contact bar, a holding device with contacting and retaining pins for retaining and electrically contacting the rotor at the rotor disk. In the area of the blades integrally formed onto the rotor disk, auxiliary cathodes are arranged which are adaptable in form, size and arrangement to the blade geometry and the current flow to be obtained via the electrolyte to control the etching effect in the blade area. Besides uniform etch attack, the auxiliary cathodes related to the blades also provide for protection against burning of the blade tips.

In a further development of the present invention, the auxiliary cathodes for influencing the current flow and the etching effect are arranged at one or both blade edges and/or at the blade tips and/or each between the blades at a distance corresponding to the respective requirements.

In a further development of the present invention, the auxiliary cathodes are provided as an annular disk spaced from the blade side edges or as a tubular section spaced from the blade tips or also as a ring with a certain, for example circular, cross-sectional shape. The auxiliary cathodes may also include a plurality of individual cathode sections arranged beside, above, beneath or between the blades.

In a further development of the present invention, the holding device has a retaining bracket at whose bottom end first and second retaining arms are provided. Arranged at the mutually facing free ends of the retaining arms are the contacting and retaining pins engaging on both sides with the thickened inner area of the rotor disk and connecting to the positive pole of a direct-current source. Thus, the wetting of the rotor is only interrupted at the points of engagement between the contacting and retaining pins and the rotor disk.

In development of the present invention, the auxiliary cathodes are attached to the retaining bracket in an electrically insulated manner and connected to an electric conductor routed in an insulated manner on the retaining bracket and connecting to the negative pole of a direct-current source.

The first retaining arms are attached directly to the retaining bracket, and the second retaining arms are threadably attachable to the retaining bracket by a threaded connection to clamp the rotor disk between the contacting and retaining pins.

The present invention is more fully described in light of the accompanying drawings showing a preferred embodiment. In the drawings, FIG. 1 is a schematic representation of an apparatus for electrolytically etching a blisk, FIG. 2 is a schematic representation of a partial sectional view of a blisk with auxiliary cathodes differently arranged and designed in the blade area, and FIG. 3 is a schematic representation of a holding device connected as anode for a blisk with auxiliary cathodes attached to the latter in an insulated manner and related to the blade area of the blisk.

Figure 2:
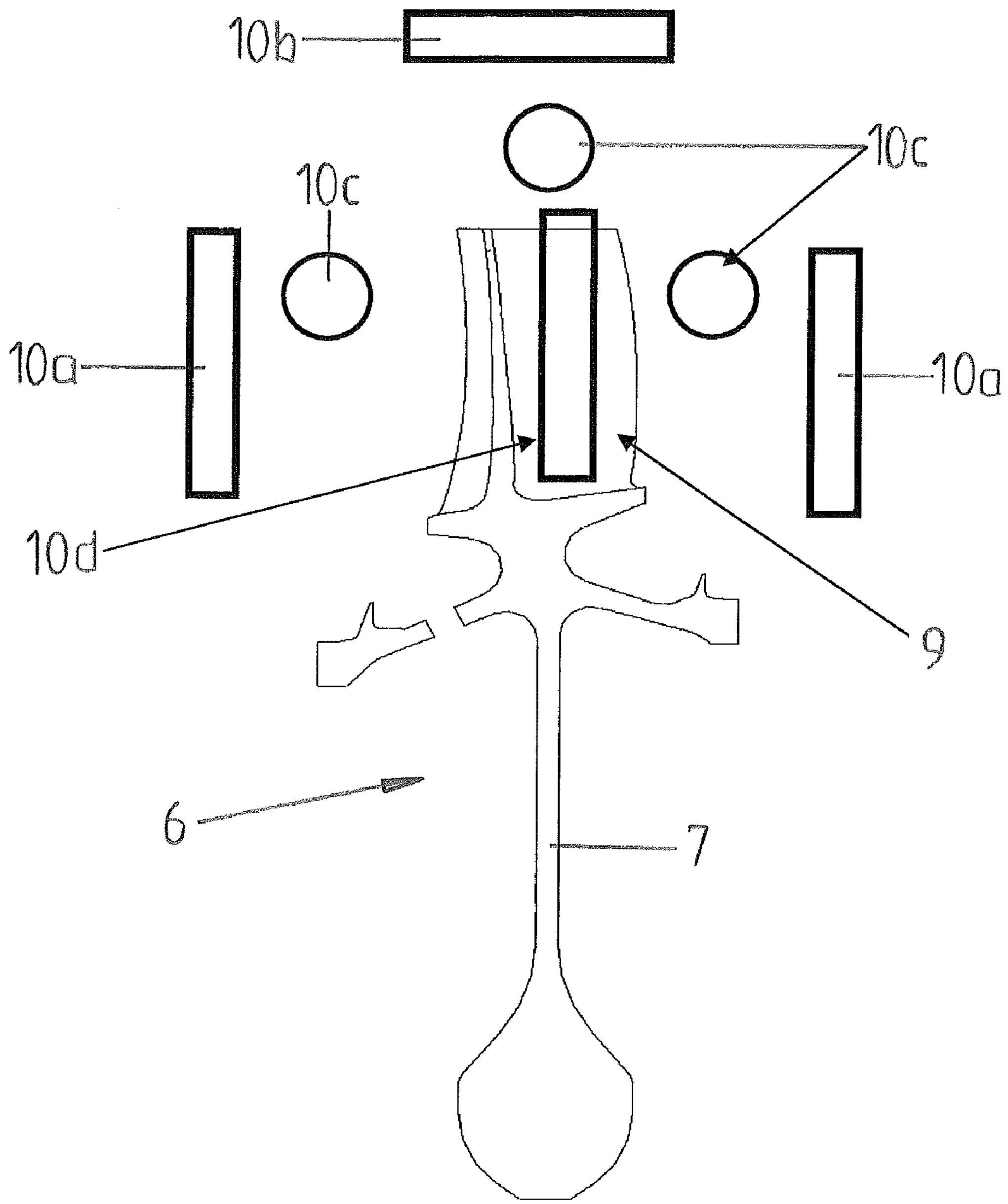

The etching apparatus illustrated in FIG. 1 includes a container 2 filled with electrolyte 1 and main cathodes 3 arranged in the container 2 and connected to the negative pole of a direct-current source. A holding device 5 is suspended from a contact bar 4 arranged above the container 2 and connected to the positive pole of the direct-current source. A rotor 6 is positioned at the bottom end of and conductively connected to the holding device 5 immersed in the electrolyte 1, sulphuric acid in the present example, and therefore acts as an anode whose surface is to be etched. Attachment and conductive connection of the holding device 5 to the rotor disk 7 of the blisk-type rotor 6 is indicated by arrowhead 8. Auxiliary cathodes 10 connected to the negative pole of the direct-current source are arranged in the area of the blades 9 integrally formed onto the rotor disk 7. In FIG. 2, the auxiliary cathodes 10 can be provided as annular disks 10*a* spaced sidewards from the blades 9, or as a circumferentially extending tubular section 10*b* spaced radially from the blade tips. As shown in FIG. 2, the auxiliary cathodes can also be provided as rings 10*c* with circular or any other cross-sections, or as cathode sections 10*d* arranged between adjacent blades 9 and protruding into the space between the blades and, additionally, adapted in shape to the blade curvature. Besides their shape, the auxiliary cathodes 10 are also variable in number, disposition and distance to the blade area. Also, any combination of the disclosed cathodes can be used in conjunction with one another. As shown in FIG. 3, an auxiliary cathode 10 in the form of an annular disk 10*a* and an auxiliary cathode 10 in the form of a ring 10*c* with circular cross-section can be related to the blade area of the same rotor (blisk) 6.

Figure 3:
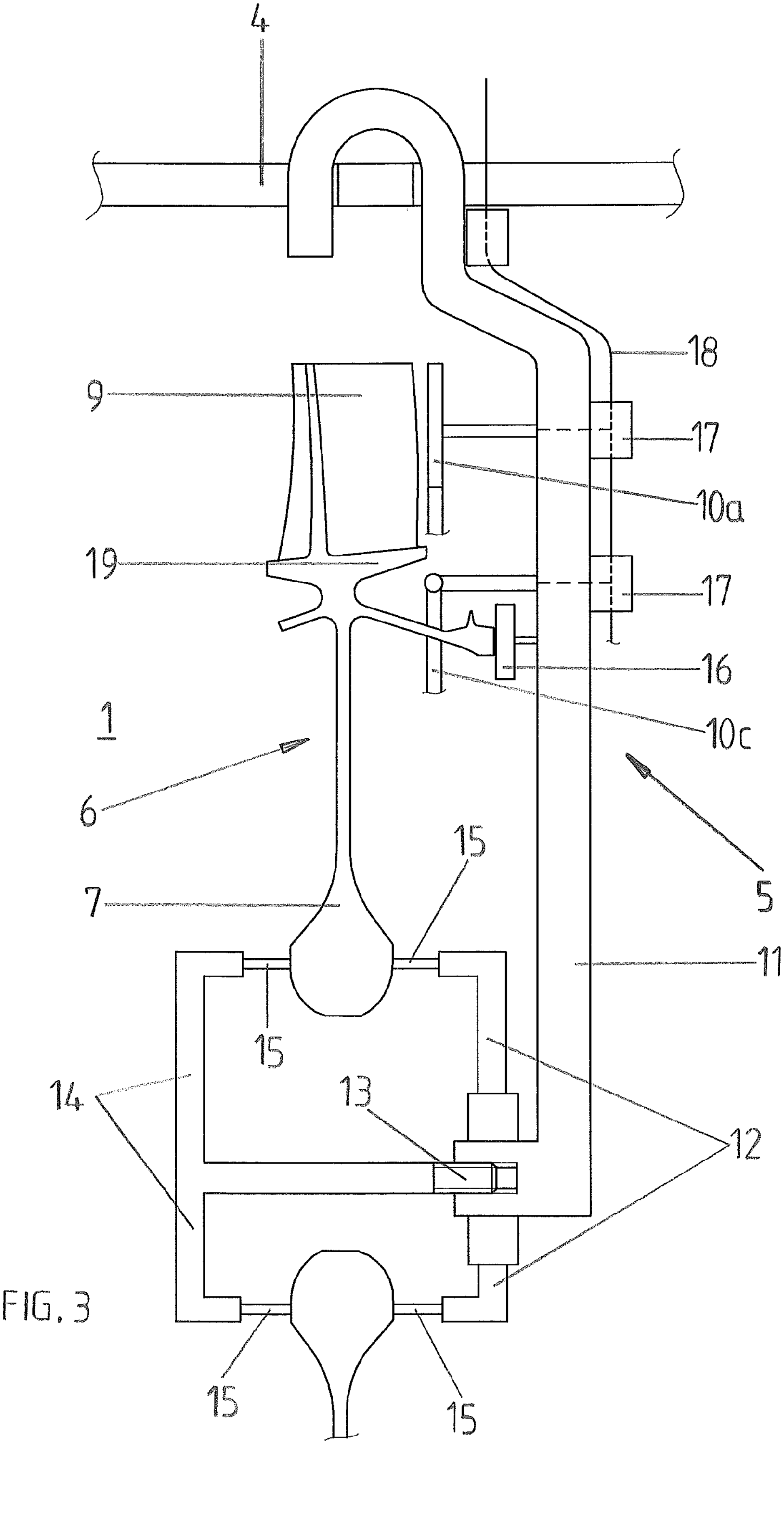

The holding device 5 exemplified in FIG. 3 includes, suspended from the contact bar 4, a retaining bracket 11 with first—integrally provided—retaining arms 12 and second retaining arms 14 threadedly attachable to the retaining bracket 11 via a threaded connection 13. The rotor disk 7 is held between contact pins 15 provided at the ends of the retaining arms 12, 14 and, therefore, conductively connected to the retaining bracket 11 attached to the contact bar 4. Furthermore, the rotor disk 7 is supported on the retaining bracket 11 via a spacer 16 made of insulating material. An electrical conductor 18 routed in insulation blocks 17 on the retaining bracket 11 is connected, on the one hand, to the negative pole of the direct-current source and, on the other hand, to an auxiliary cathode 10 in the form of an annular disk 10*a* circumferentially extending at a side edge of the blades 9 and to a further auxiliary cathode 10 in the form of a ring 10*c* disposed underneath the blade platforms 19 of the blades 9.

After being cleaned, the rotor 6 (blisk) is etched upon attachment to the holding device, immersion in the electrolyte 1 kept under agitation by a stirrer (not shown) and application of a specific voltage. The flow of current from the workpiece acting as an anode via the electrolyte to the cathode will not take place in the blade area via the more remotely situated main cathodes 3, but directly via the auxiliary cathodes 10 positioned closer to the blades 9 or the blade area, respectively, and designed in accordance with the blade geometry, thus enabling a material removal to be specifically set via the auxiliary cathode parameters (shape, size, distance, arrangement) which in all blade parts is uniform and appropriate for structural examination. Upon removal from the electrolyte 1 and the holding device 5, the rotors 6 (blisks) thus etched are multiply rinsed/cleaned and subsequently dried, being then reliably structurally examinable in all areas of the rotor disk 7 and the blades 9.

LIST OF REFERENCE NUMERALS

1 Electrolyte
2 Container
3 Main cathodes
4 Contact bar
5 Holding device
6 Integrally bladed rotor (blisk)
7 Rotor disk
8 Arrowhead—conductive connection
9 Blade
10 Auxiliary cathode
10*a* Annular disk
10*b* Tubular section
10*c* Ring with circular cross-section
10*d* Cathode sections
11 Retaining bracket
12 First retaining arm
13 Threaded connection
14 Second retaining arm
15 Contacting and retaining pins
16 Spacer
17 Insulation blocks
18 Electrical conductor
19 Blade platform

What is claimed is:

1. An apparatus for etching surfaces of an integrally bladed rotor made of a nickel-base material for an aircraft gas turbine, comprising:

an electrical source;

a container containing an electrolyte;

at least one main cathode positioned in the electrolyte and connected to the electrical source;

a holding device for holding an integrally bladed rotor to be subjected to surface etching in the electrolyte, the holding device including a contacting and retaining device for contacting a rotor disk of the integrally bladed rotor and connecting the integrally bladed rotor to the electrical source as an anode;

at least one auxiliary cathode positioned in the electrolyte in an area of the blades integrally formed onto the rotor disk and connected to the electrical source, and the at least one auxiliary cathode being adapted in form, size and arrangement to a blade geometry, to create a generally uniform current flow from all parts of the rotor via the electrical source, the integrally bladed rotor as the anode and the electrolyte to the at least one main and auxiliary cathode and produce an intense and generally uniform etching effect on the rotor; the at least one main cathode extending in a radial direction of the rotor from a blade tip of the rotor to an opposite blade tip of the rotor to extend across an entirety of a diameter of the rotor, the at least one auxiliary cathode being an annual disc having an outer radius positioned generally adjacent a blade tip region of the rotor and an inner radius positioned before reaching a center axis of the integrally bladed rotor to leave a central portion of the integrally bladed rotor uncovered by the at least one auxiliary cathode, the at least one auxiliary cathode extending in a radial direction of the rotor from the outer radius to the inner radius to substantially correspond to at least a radial height of the blades of the rotor;

wherein at least a portion of the at least one auxiliary cathode is positioned between a position of the integrally bladed rotor and the at least one main cathode such that a straight line of shortest distance extending from the position of the integrally bladed rotor in at least one portion of the area of the blades must pass through the at least one auxiliary cathode before touching the at least one main cathode.

2. The apparatus of claim 1, wherein the at least one auxiliary cathode is positioned at least one chosen from one blade side edge, both blade side edges, blade tips and between the blades.

3. The apparatus of claim 2, wherein the holding device includes a retaining bracket with the contacting and retaining device positioned at a bottom end thereof, the contacting and retaining device including first and second retaining arms mutually facing each other, and a plurality of contacting and retaining pins positioned at mutually facing free ends of the first and second retaining arms for engaging both sides of a thickened inner area of the rotor disk.

4. The apparatus of claim 3, and further comprising at least one electrical insulator by which the at least one auxiliary cathode is attached to the retaining bracket in an electrically insulated manner and an insulated electric conductor routed in an insulated manner on the retaining bracket for connecting the at least one auxiliary cathode to the electrical source.

5. The apparatus of claim 4, and further comprising a threaded connection attaching the second retaining arms to at least one chosen from the retaining bracket and the first retaining arms, and wherein the first retaining arms are attached directly to the retaining bracket such that the rotor disk is clampable between first retaining arms and the second retaining arms via the threaded connection.

6. The apparatus of claim 1, wherein the holding device includes a retaining bracket with the contacting and retaining device positioned at a bottom end thereof, the contacting and retaining device including first and second retaining arms mutually facing each other, and a plurality of contacting and retaining pins positioned at mutually facing free ends of the first and second retaining arms for engaging both sides of a thickened inner area of the rotor disk.

7. The apparatus of claim 6, and further comprising at least one electrical insulator by which the at least one auxiliary cathode is attached to the retaining bracket in an electrically insulated manner and an insulated electric conductor routed in an insulated manner on the retaining bracket for connecting the at least one auxiliary cathode to the electrical source.

8. The apparatus of claim 7, and further comprising a threaded connection attaching the second retaining arms to at least one chosen from the retaining bracket and the first retaining arms, and wherein the first retaining arms are attached directly to the retaining bracket such that the rotor disk is clampable between first retaining arms and the second retaining arms via the threaded connection.

9. The apparatus of claim 1, and further comprising at least one electrical insulator by which the at least one auxiliary cathode is attached to the holding device in an electrically insulated manner and an insulated electric conductor routed in an insulated manner on the holding device for connecting the at least one auxiliary cathode to the electrical source.

10. The apparatus of claim 9, wherein the contacting and retaining device includes at least one first retaining arm positionable on one side of the rotor disk, at least one second retaining arm positionable on a second side of the rotor disk and a threaded connection operatively attaching the at least one second retaining arm to the at least one first retaining arm in a movable manner such that the rotor disk is clampable between at least one first retaining arm and the at least one second retaining arm via the threaded connection.

11. The apparatus of claim 1, wherein the contacting and retaining device includes at least one first retaining arm positionable on one side of the rotor disk, at least one second retaining arm positionable on a second side of the rotor disk and a threaded connection operatively attaching the at least one second retaining arm to the at least one first retaining arm in a movable manner such that the rotor disk is clampable between at least one first retaining arm and the at least one second retaining arm via the threaded connection.

12. An apparatus for etching surfaces of an integrally bladed rotor made of a nickel-base material for an aircraft gas turbine, comprising:

an electrical source;

a container containing an electrolyte;

at least one main cathode positioned in the electrolyte and connected to the electrical source;

a holding device for holding an integrally bladed rotor to be subjected to surface etching in the electrolyte, the holding device including a contacting and retaining device for contacting a rotor disk of the integrally bladed rotor and connecting the integrally bladed rotor to the electrical source as an anode;

at least one auxiliary cathode positioned in the electrolyte in an area of the blades integrally formed onto the rotor disk and connected to the electrical source, and the at least one auxiliary cathode being adapted in form, size and arrangement to a blade geometry, to create a generally uniform current flow from all parts of the rotor via the electrical source, the integrally bladed rotor as the anode and the electrolyte to the at least one main and auxiliary cathode and produce an intense and generally uniform etching effect on the rotor; the at least one main cathode extending in a radial direction of the rotor from a blade tip of the rotor to an opposite blade tip of the rotor to extend across an entirety of a diameter of the rotor, the at least one auxiliary cathode having an annular shape having an outer radius positioned generally adjacent a blade tip region of the rotor and an inner radius positioned before reaching a center axis of the integrally bladed rotor to leave a central portion of the integrally bladed rotor uncovered by the at least one auxiliary cathode, the at least one auxiliary cathode extending in a radial direction of the rotor from the outer radius to the inner radius to substantially correspond to at least a radial height of the blades of the rotor;

wherein at least a portion of the at least one auxiliary cathode is positioned between a position of the integrally bladed rotor and the at least one main cathode such that a straight line of shortest distance extending from the position of the integrally bladed rotor in at least one portion of the area of the blades must pass through the at least one auxiliary cathode before touching the at least one main cathode.

13. An apparatus for etching surfaces of an integrally bladed rotor made of a nickel-base material for an aircraft gas turbine, comprising:

an electrical source;

a container containing an electrolyte;

at least one main cathode positioned in the electrolyte and connected to the electrical source;

a holding device for holding an integrally bladed rotor to be subjected to surface etching in the electrolyte, the holding device including a contacting and retaining device for contacting a rotor disk of the integrally bladed rotor and connecting the integrally bladed rotor to the electrical source as an anode;

at least one auxiliary cathode positioned in the electrolyte in an area of the blades integrally formed onto the rotor disk and connected to the electrical source, and the at least one auxiliary cathode being adapted in form, size and arrangement to a blade geometry, to create a generally uniform current flow from all parts of the rotor via the electrical source, the integrally bladed rotor as the anode and the electrolyte to the at least one main and auxiliary cathode and produce an intense and generally uniform etching effect on the rotor; the at least one main cathode extending in a radial direction of the rotor from a blade tip of the rotor to an opposite blade tip of the rotor to extend across an entirety of a diameter of the rotor, the at least one auxiliary cathode extending continuously in an azimuthal direction and having an outer radius positioned generally adjacent a blade tip region of the rotor and an inner radius positioned before reaching a center axis of the integrally bladed rotor to leave a central portion of the integrally bladed rotor uncovered by the at least one auxiliary cathode, the at least one auxiliary cathode extending in a radial direction of the rotor from the outer radius to the inner radius to substantially correspond to at least a radial height of the blades of the rotor;

wherein at least a portion of the at least one auxiliary cathode is positioned between a position of the integrally bladed rotor and the at least one main cathode such that a straight line of shortest distance extending from the position of the integrally bladed rotor in at least one portion of the area of the blades must pass through the at least one auxiliary cathode before touching the at least one main cathode.

* * * * *